United States Patent
Hanisch et al.

[11] Patent Number: 6,006,429
[45] Date of Patent: Dec. 28, 1999

[54] METHOD OF INDUCTIVELY HARDENING THE CAMS OF A CAMSHAFT

[75] Inventors: Gustav Hanisch, Hochdorf; Christoph Duell, Korntal, both of Germany

[73] Assignee: DaimlerChrysler AG, Stuttgart, Germany

[21] Appl. No.: 08/956,650

[22] Filed: Oct. 23, 1997

Related U.S. Application Data

[62] Division of application No. 08/458,648, Jun. 2, 1995, Pat. No. 5,737,975.

[30] Foreign Application Priority Data

Jun. 9, 1994 [DE] Germany ................ 44 20 092

[51] Int. Cl.$^6$ .................................................. B23P 15/00
[52] U.S. Cl. ............................................ 29/888.1; 74/569
[58] Field of Search ................. 29/888.1; 148/566, 148/567, 572, 328, 904; 74/567, 569

[56] References Cited

U.S. PATENT DOCUMENTS

| | | | |
|---|---|---|---|
| 3,598,458 | 8/1971 | Evans .................................. | 308/167 |
| 4,584,034 | 4/1986 | Hagiwara et al. ................... | 148/31 |
| 4,675,488 | 6/1987 | Mucha et al. . | |
| 4,744,836 | 5/1988 | Pfaffmann . | |
| 4,749,834 | 6/1988 | Mucha et al. . | |
| 4,785,147 | 11/1988 | Mucha et al. . | |
| 4,798,178 | 1/1989 | Greulich et al. ................... | 123/90.6 |

(List continued on next page.)

FOREIGN PATENT DOCUMENTS

| | | |
|---|---|---|
| 37 17 190 | 12/1988 | Germany . |
| 37 17 534 | 12/1988 | Germany . |
| 38 36 328 | 4/1990 | Germany . |
| 39 29 179 | 3/1991 | Germany . |
| 41 21 951 | 12/1992 | Germany . |
| 61-56242 | 3/1986 | Japan . |
| 63-318363 | 12/1988 | Japan . |

OTHER PUBLICATIONS

German article entitled "Präzisions–Stahlrohr ist Herz der gebauten Nockenwelle", Seite 48, VDI nachrichten, Nr. 39 / Sep. 26, 1986.
German catalog entitled "Gebaute Nockenwellen" by Presta Someflor–date unknown.
Geschäftsbericht 1988 der Oerlikon–Bührle Holding AG und des Oerlikon–Bührle Konzerns (Stand Dec. 31, 1988).

(List continued on next page.)

*Primary Examiner*—Irene Cuda
*Attorney, Agent, or Firm*—Evenson, McKeown, Edwards & Lenahan, PLLC

[57] ABSTRACT

A built-up camshaft has cam discs which are secured to a tube under mechanical prestress, are of annular design, and are inductively hardened all the way around at a boundary layer on their outer periphery before they are secured to the tube. The hardening of the boundary layer is formed in such a manner that, due to the hardening, high residual compressive stresses (at least $-450$ N/mm$^2$) are produced in an at least approximately 0.5 mm deep boundary zone near the surface in such a manner that, even after the cam discs are mounted on the tube, the superimposing residual tensile stresses in the boundary zone, induced by the joining, only partly compensate the original residual compressive stresses, i.e. there are still only residual compressive stresses (at least $-150$ N/mm$^2$) in the boundary zone near the surface even after the pressing-on. Sufficiently high residual compressive stress in the boundary zone can be produced by effecting the inductive heating of the cam disc in two stages. Specifically, first of all the cam disc is loaded with a medium-frequency alternating magnetic field and thus the entire annular body of the cam disc is preheated to at least 250° C. but below the transformation temperature. The cam disc is then loaded with a second alternating magnetic field changed in its intensity and/or its frequency relative to the alternating magnetic field of the first stage, as a result of which only the boundary zone is heated up to the transformation temperature or below it. After the quenching of the cam disc heated in such a manner, the high residual compressive stresses appearing a boundary zone of sufficient depth.

7 Claims, 4 Drawing Sheets

U.S. PATENT DOCUMENTS

| | | |
|---|---|---|
| 4,855,551 | 8/1989 | Mucha et al. . |
| 4,905,538 | 3/1990 | Watanabe et al. . |
| 5,004,370 | 4/1991 | Swars . |
| 5,009,395 | 4/1991 | Pfaffmann . |
| 5,037,490 | 8/1991 | Swars et al. ............................. 148/572 |
| 5,039,360 | 8/1991 | Brugarolas et al. .................... 148/251 |
| 5,308,408 | 5/1994 | Katila ..................................... 148/328 |

OTHER PUBLICATIONS

German article entitled "Wälzfestigkeit einsatzgehärteter Bauteile" by H. Stangner et al., Carl Hanser Verlag, Muenchen 1990, pp. 224–229.

Bid dated Feb. 3, 1988 and invoice of Feb. 26, 1988.

German article entitled "Kraft und Formschuluss halten gestinterte Nocken auf gängige Rohre" by Von Michael Pyper, Seite 46, VDI nachrichten, Nr. 39 / Sep. 25, 1987.

German article entitled "Einfluss von Eigenspannungen auf die Werkstoffanstrengung in wälzbeanspruchten Bauteilen" by E. Broszeit et al., Z. Werkstofftechnik 16, (1985). pp. 19–24.

German article entitled "über röntgenographische und mechanische Eigenspannungsanalysen an induktiv gehärteten Nocken aus 100Cr6", Karlsruhe University, Apr. 8, 1994, pp. 1–9.

German article entitled "über röntgenographische und mechanische Eigenspannungsanalysen an induktiv gehärteten, aufgepressten Nocken aus 100Cr6", Karlsruhe University, Apr. 21, 1994, pp. 1–5.

German article entitled "über röntgenographische und mechanische Eigenspannungsanalysen sowie Restaustenitbestimmungen an induktiv gehärteten Nocken aus 100Cr6", Karlsruhe University, Jun. 2, 1994, pp. 1–6.

German article entitled "über röntgenographische und mechanische Eigenspannungsanalysen an einer induktiv gehärteten Nocken aus 100Cr6", Karlsruhe University, Mar. 1, 1994, pp. 1–4.

German article entitled "Untersuchungen für Fa. Presta: Gebaute Nockenwelle für Ford (USA) mit Nocken aus 100 Cr 6 GKZ HI", Nov. 2, 1993.

Automotive Technology International '92 entitled "Selective surface treatmentof gears by induction profile hardening" by George D. Pfaffmann, pp. 143, 145, 146, 149 and 150.

German article entitled "Eigenspannungen; Definition und Entstehungsursachen" by K.H. Kloos, Deutshche Gesellschaft für Metallkunde E.V., 1979.

METHOD OF INDUCTIVELY HARDENING THE CAMS OF A CAMSHAFT

This application is a division of application Ser. No. 08/458,648, filed Jun. 2, 1995, now U.S. Pat. No. 5,737,975.

BACKGROUND AND SUMMERY OF THE INVENTION

The invention relates to a built-up camshaft having cam discs which are secured to a preferably tubular shaft body under mechanical prestress, are of approximately annular design and are hardened before they are secured to the shaft body. The invention further relates to a method of inductively hardening the boundary layer of the outer periphery of cam discs for a built-up camshaft, which cam discs are of approximately annular design and can be secured after the hardening to a preferably tubular shaft body under mechanical prestress. In the boundary zone to be hardened, the cam disc is heated to transformation temperature by rotation in an alternating magnetic field. The magnetic field is concentric to the rotation axis and is produced by a ring inductor which can be loaded by alternating current. The cam disc is heated on account of corresponding alternating eddy currents induced in the cam disc and is then quenched by an external quenching medium, for hardening the boundary layer of the cam disc for a built-up camshaft.

In the course of further developing internal combustion engines having less consumption and lower emissions, the engine developers are adopting increasingly "sharper", i.e. steeper rising, cams and cam followers having rollers, both of which lead to greater loading of the cams, in particular in the flank region. The higher cam loading requires better materials at least for the cams. A high-grade cam material on the one hand and normal engineering steel for the shaft body on the other hand lead to a composite construction of the camshaft, the so-called "built-up" camshaft. Apart from the price advantage over a forged or cast camshaft, which is made entirely of the high-grade material, a built-up camshaft also offers weight advantages.

German Patent document DE 37 17 190 C2 discloses a built-up camshaft in which sintered cam discs are pressed axially onto a tubular shaft body and are additionally secured in a positive-locking manner in the direction of rotation. This positive locking is brought about automatically by the pressing-on. Specifically, to secure a cam disc to the shaft tube, peripheral grooving is rolled in its periphery at the relevant axial position and over a length corresponding to the width of the cam disc. The peripheral grooving enlarges the effective outside diameter of the shaft tube locally in a deliberate manner. The cam disc is then pressed axially in the desired peripheral position onto this cam seat enlarged in diameter. Since the cam discs are designed as sintered bodies, they contain, on account of the manufacturing process, many small pores and material interruptions which adversely affect the service life of the cams during alternating loading due to a high Hertzian stress. Apart from that, formed sintered bodies, due to the process, are expensive when compared with workpieces made of solid material. Production of the formed bodies by the sintering method is only worthwhile when comparatively complicated forms have to be produced. This, however, does not apply in the case of cam discs.

Therefore steel cam discs are adopted, which for loading and wear reasons are inductively hardened at the boundary layer over their entire outer periphery. In order for the perforated cam discs to adhere to the tube of the shaft body completely free of play, even after a prolonged period of use, the cam discs should not be fully hardened down to the inner surfaces of the aperture mounted on the tube. On the contrary, in addition to the ductile shaft body, the inner surface of the cam disc should also maintain a certain plasticity. However, this hardening of the boundary layer of the cam disco must not be effected after the mounting of the cam discs on the shaft body, since otherwise the firmly adhering bond would be loosened in an inadmissible manner by the heat treatment.

Due to the pressing-on or other frictional, possibly positive-locking, securing of the cam discs hardened at the boundary layer on the outer periphery, tensile stresses occur in the annular cam disc. In conventionally induction-hardened cam discs, through the addition of the operational load likewise causing tensile stresses, the tensile stresses occurring in the annular cam disc lead on the whole to tensile stresses which lie close to the fatigue strength of the material and, accordingly, lead very quickly to surface cracks or, in the extreme case, to the cam-disc ring being torn apart. Therefore, built-up camshafts of the generic type having cam discs inductively hardened at the boundary layer on the outer periphery have been unable to gain acceptance hitherto in series application for internal combustion engines, at least in the lightweight construction required for passenger cars and at least in conditions of use with high surface pressures, e.g. roller tappets.

German Patent document DE 37 17 534 C2 likewise shows a built-up camshaft in which the shaft tube is expanded by hydraulic internal pressure applied locally in a deliberate manner. The shaft tube is pressed on the inside under prestress against the inside of the cam disc. Here, the cam disc, if possible, is only to be deformed elastically. After hydraulic relief of the shaft tube, the cam disc radially springs back and adheres firmly to the plastically expanded shaft tube. The cam disc is already largely machine-finished before being secured to the shaft tube. If need be, grinding can still be carried out after the joining. In particular, the cam disc is already hardened at the outer periphery before the joining. This German Patent document mentions with reference to an earlier publication that the hardened surface of the cams tends to form cracks during the elastic deformation. To avert this risk of crack formation, it is therefore proposed to axially spread apart the seating region of the cam on the shaft tube on the one hand, and the actual cam body on the other hand, and to configure the seating region to be radially yielding and the actual cam region to be radially rigid. However, this configuration of a built-up camshaft fails when—as in most cases—the cams have to be accommodated on the shaft tube at a very small axial distance apart.

There is therefore needed an improved camshaft to the effect that a useful service life of the camshaft or the cam disc can be expected. Furthermore, there is needed an improved method for inductively hardening the boundary layer along the same lines.

These needs are met according to the present invention by a built-up camshaft having cam discs which are secured to a preferably tubular shaft body under mechanical prestress, are of approximately annular design and are hardened before they are secured to the shaft body. The cam discs are inductively hardened at a boundary layer on their outer periphery in such a manner that the residual compressive stresses, induced by the hardening, in the hardened boundary zone near the surface are so high that, after the cam discs are mounted on the shaft body, the superimposing residual tensile stresses, induced by the joining, in the boundary zone only partly compensate the original residual compressive stresses, i.e. that there are still only residual compressive stresses in the boundary zone near the surface even after the mounting.

The method according to the present invention for inductively hardening the boundary layer of the outer periphery of the cam discs for a built-up camshaft effects heating in two stages in order to produce sufficiently high residual compressive stress in the boundary zone of the cam disc. In a first stage, the entire annular body of the cam disc is preheated to at least 250° C. but at most to a limiting temperature lying below the transformation temperature by loading the cam disc with a medium-frequency alternating magnetic field. In a subsequent second stage, only the radially outer boundary zone of the preheated cam disc is heated up to a temperature lying at or above the transformation temperature by loading the cam disc with a second alternating magnetic field changed in its intensity and/or its frequency relative to the alternating magnetic field of the first stage.

The advantages of the improved camshaft according to the invention lie in the fact that the corresponding camshafts have a justifiable service life only with permanent residual compressive stresses in the hardened boundary zone of the mounted cam discs. The high residual compressive stresses establishing the service life can be produced during the hardening by the hardening method. The surprising solution to the strength problem lies in forcing residual compressive stresses near the boundary even after the pressing-on. These can be achieved by the induction hardening being run, before the pressing-on, to extremely high residual compressive stress at small hardness penetration depth. The tensile stresses induced by the joining must therefore be overcompensated as it were by "allowance" being made for an appropriately high residual compressive stress during the hardening. The especially high residual compressive stresses during the hardening of a thin boundary layer are achieved by the two-stage workpiece heating during the induction hardening with full cross-section preheating of the cam ring and the actual induction hardening, building up thereon, of the boundary layer.

The magnitude of the residual compressive stresses can be determined by non-destructive radiographic testing in a thin boundary layer down to a depth of about 5 $\mu$m. Although this non-destructive radiographic testing method and its handling are not exactly simple, it has been generally known for a long time. In the relevant literature, the following publications can be referred to:

1) E. Macherauch, P. Mueller: Das $\sin^2$ $\psi$-Verfahren der roentgenographischen Spannungsmessung [The $\sin^2$ $\psi$-method of radiographic stress measurement], Zeitschrift fuer angewandte Physik 13 (1961), pages 305 to 312;

2) Book: Eigenspannunge(n and Lastspannungen [Residual stresses and load stresses], Editor: v. Hauk, E. Macherauch, Carl Hanser Verlag, Munich, Vienna (1982);

3) B. Scholtes: Roentgenographische Spannungsermittlung, ihre Grundlagen and Anwendungen [Radiographic stress determination, its fundamentals and applications], in the book: Roentgen—und Elektronenbeugung [X-ray and electron diffraction], 65–85, editor S. Steeb, series Rontakt und Studium, volume 144, expert Verlag, Sindelfingen (19xx);

4) A Useful Guide for X-Ray Stress Evaluation. In: Advances in X-Ray Analysis 27 (1984), pages 81 to 99, Plenum Publishing Corp; and 5) Residual Stresses in Science and Technology, editor: E. Macherauch, V. Hauk, DGM-Informationsgesellschaft, Oberursel (1987).

If the depth profile of the residual stresses is also to be determined, the surface must be removed in layers at least locally at the measuring point in a mechanically non-reactive manner, e.g. by an electrochemical etching operation. The residual stress prevailing at the exposed surface must be determined radiographically in between for each layer. The depth profile of the residual stresses can thus only be determined in a destructive manner.

Other objects, advantages and novel features of the present invention will become apparent from the following detailed description of the invention when considered in conjunction with the accompanying drawings.

DETAILED DESCRIPTION OF THE DRAWINGS

Figure 1:
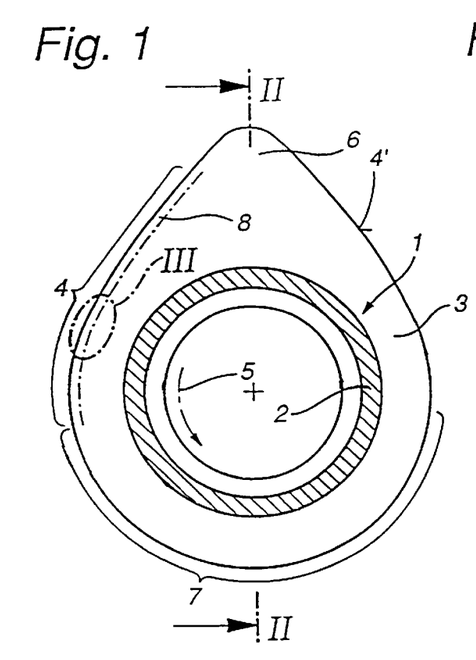
FIG. 1 is a cross-section view through a built-up crankshaft taken along section line I—I in FIG. 2.
Figure 2:
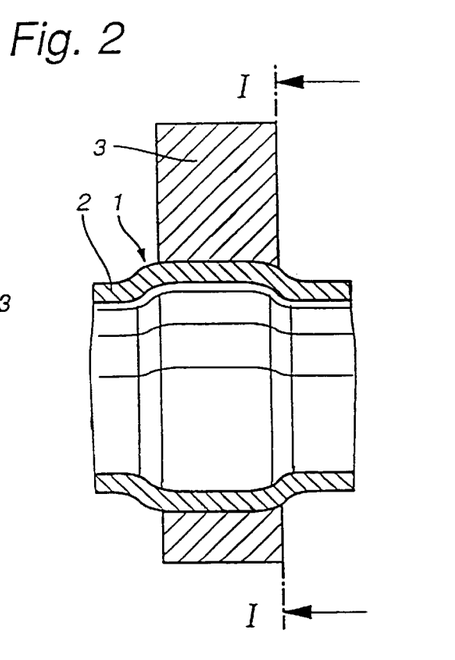
FIG. 2 is a partial cross-section view through the camshaft according to FIG. 1, taken along the section line II—II in FIG. 1.
Figure 3:
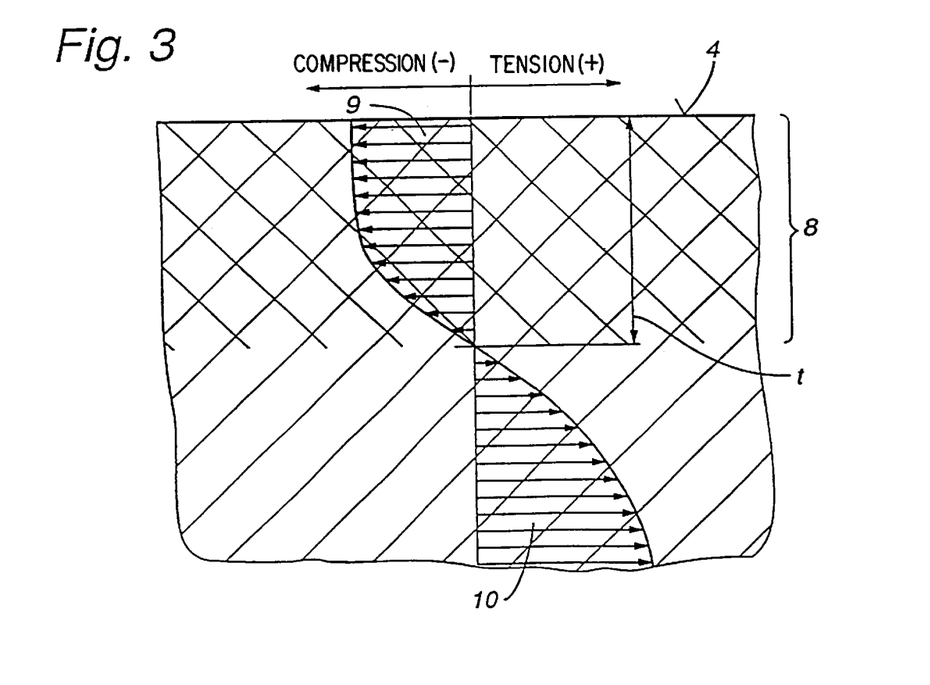
FIG. 3 is an enlarged individual representation of the detail area III from FIG. 1, illustrating the hardness depth and the depth profile of the tangential residual stresses in a region near the surface.

A built-up camshaft 1 is partially shown in FIGS. 1 and 2. It consists of a tubular shaft body 2, to which a plurality of essentially annular cam discs 3 as well as bearing discs (not shown) are secured. The cam discs 3 must of course be fixed in a defined peripheral position and also in a defined axial position on the shaft body. This is done by appropriate auxiliary devices. The type of fastening is ultimately of secondary importance for the present invention. The decisive factor is that the cam discs 3 are fixed on the shaft body 2 under permanent mechanical prestress, in which case the fixing can be assisted by positive-locking surfaces on the inside of the aperture in the cam disc 3.

In the case of the joining technique indicated in FIGS. 1 and 2, an internal high-pressure expansion of the tubular shaft body is provided in which an initially cylindrical tube is expanded on an axially restricted section by internal high pressure and is pressed on the inside against the intrados 15 (FIG. 4) of an aperture 14 inside the cam disc 3 under permanent mechanical stress. Other joining techniques can, of course, also be used, e.g. the method discussed above in German Patent document DE 37 10 190 C2 using locally deliberate expansion of a shaft body by peripheral grooving and subsequent axial pressing-on of the cam. Provided axially running grooves or projections are made at the intrados 15 of the aperture 14, the expanded tubular wall would also become embedded in these grooves or intermediate spaces and additionally bring about positive locking between the shaft body 2 and the cam disc 3. The permanent mechanical prestress between tubular shaft body 2, on the one hand, and the essentially annular cam disc 3, on the other hand, brings about a tangentially directed tensile stress in the annular body. This tensile stress is maintained for the entire service life of the camshaft. If the mechanical prestress should be reduced—for whatever reason—there is a risk that the mounted cams can work loose on the tubular shaft body under the alternating stress on the cams in the peripheral direction. There is also a risk of play occurring between the cam disc 3 and shaft body 2. This would be very dangerous, since the valve actuation is then no longer exactly in phase with the piston stroke. In such a case, there is a very high risk and probability of the reciprocating piston colliding with an open gas-exchange valve. This would very quickly causes total 1088 of the engine. Permanent fixing of the cam discs on the shaft body with sufficiently high adhesion is therefore of decisive importance. This necessitates a permanent, tangentially directed tensile stress within the annular cam-disc body and a correspondingly permanent compressive stress within the tubular shaft body.

On the other hand, the operating stress on the cams 3 due to rolling and sliding stress and high Hertzian stresses requires not only a high degree of hardness at the outer periphery of the cams but also, on the basis of the findings of the present invention, residual compressive stresses. Only when both sufficient hardness and sufficiently high residual compressive stresses are present at the outer periphery of the cams can a satisfactory service life of the built-up camshaft be expected. Furthermore, it is important that the high degree of hardness be restricted to only the outer zone of the cam discs or bearing discs, and that on the other hand the radially inner region near the intrados 15 of the central aperture 14 in the cam disc 3 remains structurally unaffected, i.e. the original relatively low hardness of the steel is retained. The radial depth T of this boundary layer 16 should be at least about 0.5 mm. In the hardening method according to the present invention, however, the depth of this "soft" inner boundary layer will usually be substantially greater than the specified value. The reason for the softness on the inside of the cam disc is due to the fact that, when both the shaft body and the cam disc are ductile at the mutual contact surface, the prestress, even during alternating stress, is retained better and permanently compared with a state in which the cam disc is hard on the inside and is no longer ductile.

Hardenable steels of high wear resistance, for example rolling-bearing steels, are suitable as materials for the cam discs and the bearing discs. In particular, a steel having the material designation 100Cr6 is to be considered here, by which is meant a high-grade steel having about 1% carbon and about 1.5% chromium. Another steel likewise suitable here has the material designation Cf53, which is an inductively hardenable steel having a carbon content of about 0.53% on average.

In order to be able to produce cam discs from such steels, the starting material can be, for example a rolled bar, the cross-section of which approximately corresponds to the outline of the cam discs. Narrow discs are sheared off from such a profiled solid material by means of profile shears having well-sharpened shearing edges, and the central aperture 14 is made by a punching operation from the blanks produced in such a manner. The wall thickness of the sheared-off discs can be produced to the desired size, surface quality and flatness between plane and smooth pressure surfaces by a plastic sizing operation in a sizing press. The exact contour of the intrados 15 can be produced with a broach in a broaching operation. Rough machining of the outer periphery is also conceivable using a broaching operation.

In order to remove the residual stresses of such blanks and furthermore achieve an optimum structure for joining and an adequate material strength (at least 650 N/mm$^2$), these blanks are annealed and cooled down slowly again. The cam discs are then hardened at a boundary layer on the outer periphery with a two-stage heating according to an induction hardening method of the invention. High residual compressive stresses are left in the hardened zone. The cam discs hardened in such a manner are joined to the tubular shaft body, and the then assembled rough camshaft is machine-finished by grinding the cam surfaces and the bearing surfaces. Grinding with the use of grinding wheels having cubic boron nitride, so-called CBN, is especially suitable here, during which low temperatures can be maintained at comparatively high metal removal rates by intensive cooling. The goal of the parameter setting is that the high residual compressive stresses produced during the induction hardening of the cam discs are in no way to be impaired by the grinding. The micro temperatures in the direct contact zone between the grinding wheel and the workpiece, and in the boundary zone of the workpiece near the surface, must not exceed a certain temperature during the grinding so that the high residual compressive stresses are retained. This must be empirically determined by optimization of the method for the grinding. It is even possible to increase the residual compressive stresses in a very thin boundary zone by suitable selection of the parameters during the grinding.

Figure 6:
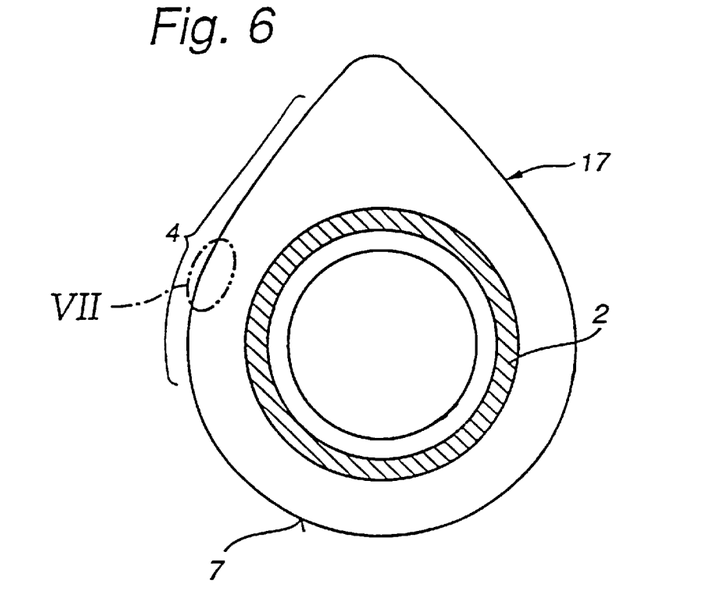
FIG. 6 is an unhardened cam disc shrunk onto a tubular shaft body.
Figure 7:
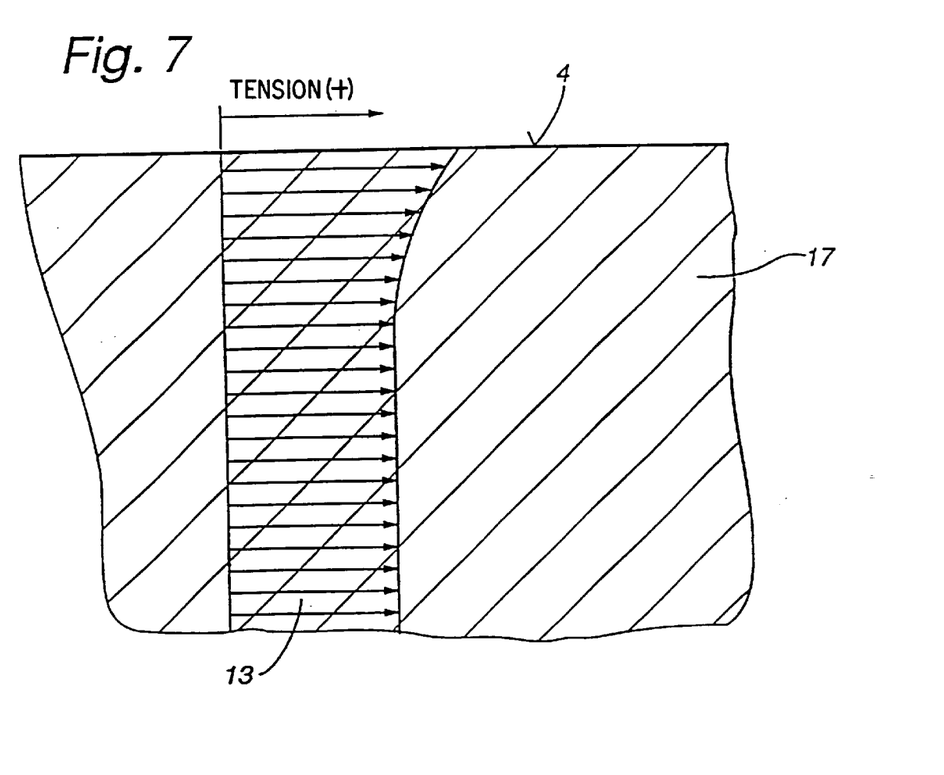
FIG. 7 is an the enlarged representation of detail area VII from FIG. 6, illustrating the depth profile of the tangential tensile stresses in a region near the surface.

Before the actual camshaft and the hardening method are further described, the phenomenon of the tensile stresses in mounted cam discs may first of all be discussed in connection with FIGS. 6 and 7. In the exemplary embodiment of a camshaft shown in FIG. 6, an unhardened cam disc 17 has been deliberately mounted on a tubular shaft body 2. Due to the shrinking-on, a tensile stress 13 which is constant in the radial direction in first approximation forms in the entire, structurally uniform cross-section of the cam disc. The magnitude of this tensile stress is caused by the mutual radial pressure between the intrados of the central aperture in the cam disc on the one side and the outer wall of the tubular shaft body on the other side. Conversely, compressive stresses likewise caused by this bond prevail in the shaft body. The compressive stresses in the shaft body on the one side and the tensile stress 13 in the cam disc 17 on the other side just balance each other with due regard to the respectively associated cross-sectional areas of the workpiece portions. The magnitude of the tensile stress 13 is about 200 N/mm$^2$ in the region of the base circle 7 of the unhardened cam disc. This tensile stress is of course lower in the region of the cam flank, since the bearing cross-section is larger there. On average, a tensile stress of about 100 N/mm$^2$ can be assumed in the region of the cam itself. This tensile stress is superimposed on the residual compressive stresses prevailing at the outer periphery due to the hardening of the cam discs according to the invention, so that the residual compressive stresses prevailing there are reduced by a corresponding amount. On account of this, an allowance must be made for appropriately high residual compressive stresses in the unjoined state of the cam discs so that residual compressive stresses still remain in an outer boundary zone 8 in the fitted state of the cam discs.

Figure 4:
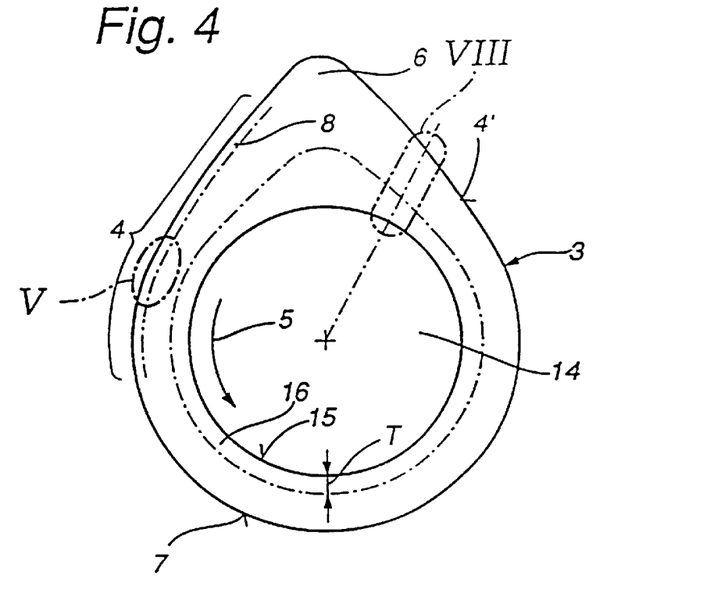
FIG. 4 is a hardened cam disc, ready for assembly, but still separate.
Figure 5:
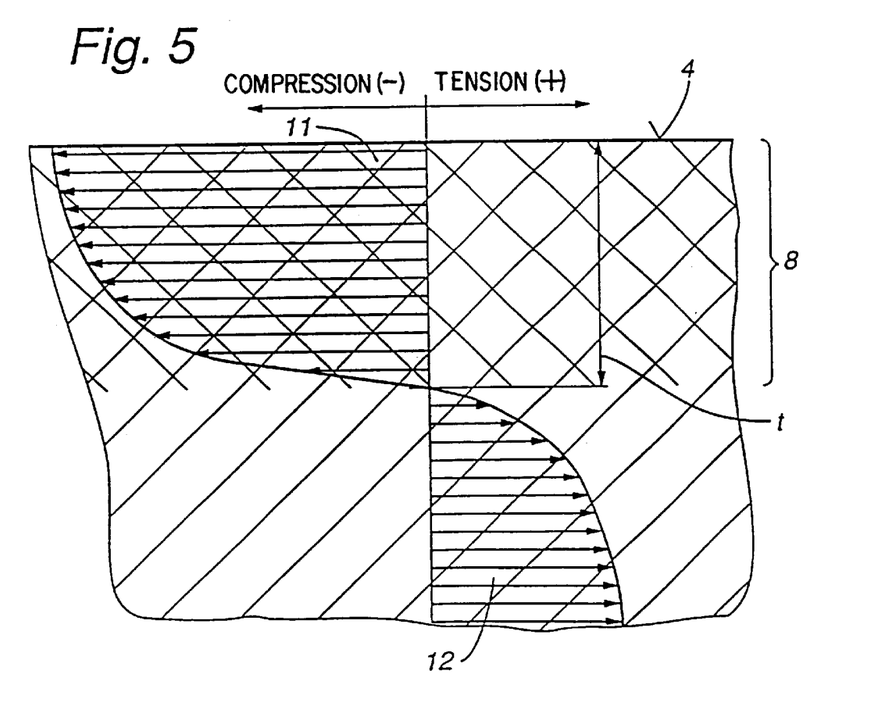
FIG. 5 is an enlarged representation of the detail area V from FIG. 4, illustrating the hardness depth and the depth profile of the tangential residual stresses in a region near the surface.

The hardening of the individual cam discs is described below in connection with FIGS. 4 and 5. The cam disc 3 having an aperture 14 includes a cam nose 6. The rising cam flank 4 of the cam lobe 6 is determined by the operating rotation direction 5. The other cam flank is the falling cam flank 4'. Lying opposite the cam nose 6 is a so-called base circle 7 in which the cam disc has a constant cross-section in a meridian section. A hardened boundary layer 8 is to be formed along the entire outer periphery of the cam nose 6 and the base circle 7. The depth t of the boundary layer 8 is at least about 0.5 mm, but preferably at least about 1 mm. As already mentioned, the cam disc must not be fully hardened. On the contrary, an inner boundary layer 16 having a depth T of at least 2 mm must remain in the region of the intrados 15 of the apertures 14. The boundary layer 16 is structurally unaffected and retains the original, low hardness of the steel and corresponding ductility. The outer boundary layer 8 is not only to be hard but is also to have, above all, a high residual compressive stress.

Specifically, the residual compressive stress 11 in the boundary zone 8 of the not yet shrunk on cam disc is to be so high that, after superimposition of the tensile stress 13 induced by the pressing-on, the remaining residual compressive stress 9 still has a certain minimum value after the mounting. Specifically, these remaining minimum values of the residual compressive stress 9 are −50 N/mm² for a steel having the material designation 100Cr6 and −150 N/mm² for a steel having the material designation Cf53. The minus sign put in front of the material designation is intended to show that the specified residual stress values concern compression. So that residual compressive stresses 11 of corresponding magnitude can form in the boundary zone 8, correspondingly high residual tensile stresses 12 must form in a layer lying radially inside this boundary zone. The integral over the region of the residual compressive stresses and over that of the residual tensile stresses must come to a total of zero in the still unjoined cam according to FIG. 4, since no external forces act on this cam disc.

The inductive boundary-layer hardening of the outer periphery of the cam discs or also of the bearing discs starts from the wide-spread induction hardening method known in principle. Here, the cam discs are rotated in an alternating magnetic field which is built up in a rotationally symmetric manner and is produced by a ring inductor which can be loaded by alternating current. On account of the alternating eddy currents induced in the workpiece, the cam disc is heated in the boundary zone to be hardened and is brought to the transformation temperature. By subsequent quenching with the use of an aqueous external quenching medium, the thermally transformed structure is "frozen in" and the hardness of the boundary layer is thereby produced.

Figure 8:
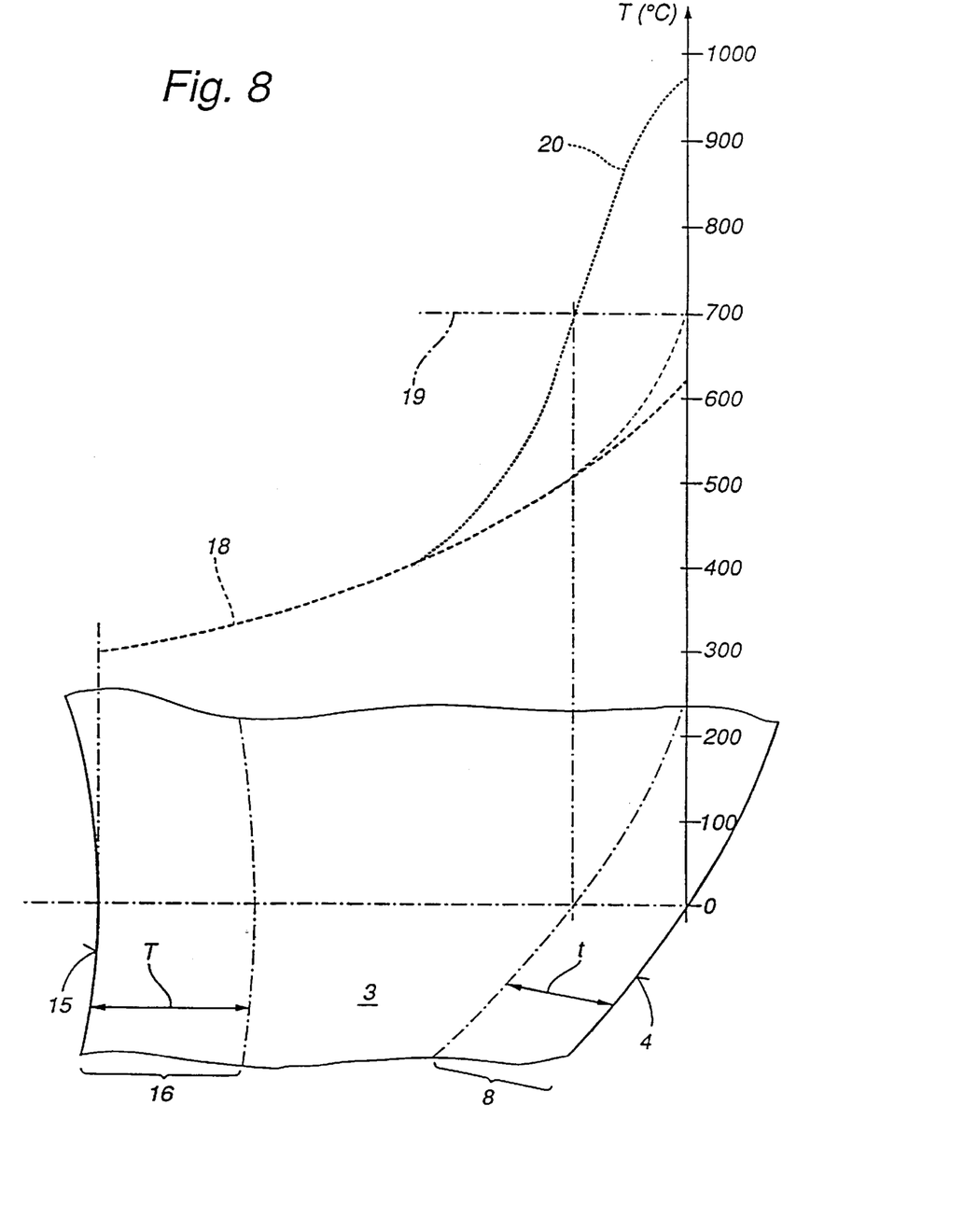
FIG. 8 is an enlarged representation of detail area VIII from FIG. 4, illustrating the temperature profile along a radius prevailing during the induction hardening in the cam disc.

In order to produce sufficiently high residual compressive stresses in the boundary zone 8 of the cam disc starting from such a hardening method previously known in principle, the heating is carried out in two stages according to the present invention. Specifically, the cam disc is loaded with a medium-frequency alternating magnetic field in the region of about 10 kHz in a first stage, the entire annular body of the cam disc being heated to at least 250° C. but at most to a limiting temperature lying below the transformation temperature 19. The radial temperature profile of the preheating stage in the cam disc along a radius according to the detail area VIII in FIG. 4 is indicated in FIG. 8 by the broken line 18. As shown, the temperature drops from outside to inside. The highest temperatures at the outer periphery, in this first pre-heating stage, may extend at most up to the transformation temperature 19 or only slightly exceed it. On the other hand, it is to be ensured that at least 250° C. is also reached in the radially inner region near the intrados 15 of the aperture. The cam disc is thermally expanded by this preheating of the entire cross-section. A certain depth action of the eddy currents is achieved through the use of the medium-frequency alternating magnetic field, which eddy currents also reach cross-sectional parts lying further to the inside.

Directly following this, the cam disc is loaded with a high-frequency alternating magnetic field in the region of about 200 kHz in a second stage. This high-frequency alternating magnetic field has only a very slight depth action so that the further heating caused thereby remains restricted to boundary parts near the surface. The temperature curve 20 of the second heating stage, building up on the temperature profile 18 of the preheating stage, is drawn in a dotted line in FIG. 8.

Due to the second heating stage, the transformation temperature 19 in the boundary zone 8 is exceeded at the desired depth t. In principle, it is also possible during the second heating stage to carry out the heating with a medium-frequency alternating magnetic field, which is convenient in particular for cases having a greater depth to be hardened. In both cases, only this zone becomes hard due to the subsequent quenching, whereas the inner regions remain soft. Although the transition from the hard structure to the thermally unaffected structure is progressive, a limit between hard and soft can be established by definition. It is often stipulated that everything that has at least 80% of the hardness at the outer surface is still "hard". As stated, the depth t of the hardened boundary zone 8 is preferably to be at least 1 mm. Apart from the depth of this boundary zone, it is above all important that there are high residual compressive stresses in this boundary zone. These residual compressive stresses appear after the two-stage heating owing to the fact that the cam disc was thermally expanded in the first heating stage. This expansion re-forms after the quenching so that the desired high residual compressive stresses are build-up in the outer zone by the quench-induced shrinking of the cam disc. For example, after the hardening but before the shrinking-on of the cam disc, the tangential residual compressive stresses 11 in a cam disc made of the material 100Cr6 are in the range of about −450 to −460 N/mm². Correspondingly high residual tensile stresses would then form radially within the boundary zone 8. In a steel having the material designation Cf53, substantially higher residual compressive stresses 11 ought to be produced in the region of the boundary zone. Here, the residual compressive stresses before the shrinking-on of the cam discs ought to be higher, namely −550 to −850 N/mm².

By the mounting of the cam discs 3, hardened according to the present invention, or bearing discs having high residual compressive stresses in the boundary zone 8, the tensile stresses 13 induced by the joining are superimposed on the residual compressive stresses 11. However, the residual compressive stresses 11 are always so high that residual compressive stresses 9 still remain in the boundary zone 8 even after the mounting. Of course, even after the shrinking-on, tensile stresses 10 induced by the joining still remain below the boundary zone 8.

Built-up camshafts having longer service life and low weight as well as low production and material costs can be produced by the cam design according to the invention and by the induction hardening method according to the invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for inductively hardening a boundary layer of an outer periphery of a cam disc for a built-up camshaft, which cam disc is of an approximately annular design and is securable after hardening to a tubular shaft body under mechanical prestress, said cam disc being heated in a boundary zone to be hardened to a transformation temperature by rotation in an alternating magnetic field, said magnetic field being concentric to the rotation axis and being produced by a ring inductor which is loaded with alternating current, the cam disc being heated on account of corresponding alternating eddy currents induced in the cam disc, said heating then being quenched by an external quenching medium, for hardening the boundary layer of said cam disc, the method comprising the steps of:

producing sufficiently high residual compressive stress in the boundary zone of the cam disc by:

in a first stage, preheating an entire annular body of the cam disc to at least 250° C. but at most to a limiting temperature lying below the transformation temperature, said preheating being performed by loading the cam disc with a medium-frequency alternating magnetic field; and in a subsequent, second stage, heating only a radially outer boundary zone of the preheated cam disc to a temperature lying at or above the transformation temperature by loading the cam disc with a second alternating magnetic field changed in at least one of its intensity and frequency relative to said alternating magnetic field of said first stage.

2. A method according to claim 1, wherein a high-frequency alternating magnetic field is used as the second alternating magnetic field.

3. A method according to claim 2, wherein a frequency in the region of about 10 kHz is used as the medium frequency of the alternating magnetic field and a frequency in the region of about 200 kHz is used as the high frequency of the alternating magnetic field.

4. A method according to claim 1, wherein a medium-frequency alternating magnetic field is used as the second alternating magnetic field.

5. A method according to claim 1, wherein hardness penetration is carried out to a hardness penetration depth (t) of at least about 0.5 mm.

6. A method according to claim 1, wherein the parameters of the hardening method are optimized to the effect that residual compressive stress in the boundary zone of the separate cam disc has the following values:

at least about −450 newtons per $mm^2$ for a steel having the material designation 100 Cr 6, and at least about −550 $N/mm^2$ for a steel having the material designation Cf 53; and wherein the minus sign indicates compression.

7. A method according to claim 1, wherein hardness penetration is carried out to a hardness penetration depth (t) of about 1 mm or more.

* * * * *